United States Patent [19]

Inagaki

[11] Patent Number: 5,025,716
[45] Date of Patent: Jun. 25, 1991

[54] INSTALLATION FOR PROCESSING FOODS IN A STERILIZED CONDITION

[76] Inventor: Jitsuo Inagaki, 71, Aza Kamiyashiki, Oaza Itsusiki, Itsusikicho, Hazugun, Aichi, Japan

[21] Appl. No.: 417,191

[22] Filed: Oct. 4, 1989

Related U.S. Application Data

[63] Continuation-in-part of Ser. No. 215,492, Jul. 6, 1988, abandoned.

[51] Int. Cl.[5] .......................... A23L 3/00; A23L 3/18; A23L 3/34; A23L 3/36
[52] U.S. Cl. ........................................ 99/468; 99/469; 99/476; 99/477; 99/484; 99/534; 134/126; 134/200; 312/1
[58] Field of Search ................ 99/467, 468, 469, 470, 99/473–476, 477, 483, 484, 516, 517, 534, 536; 134/126, 200; 312/1; 422/304, 292, 104, 291

[56] References Cited

U.S. PATENT DOCUMENTS

| | | | |
|---|---|---|---|
| 2,847,334 | 8/1958 | Kilburn et al. | 99/469 |
| 4,059,903 | 11/1977 | Piet et al. | 312/1 |
| 4,385,035 | 5/1983 | Akitoshi et al. | 422/304 |
| 4,543,879 | 10/1985 | Catelli | 99/516 |
| 4,566,376 | 1/1986 | Webb | 99/468 |
| 4,707,334 | 11/1987 | Gerhard | 422/304 |
| 4,783,129 | 11/1988 | Jacobsen | 312/1 |
| 4,812,700 | 3/1989 | Natale | 312/1 |
| 4,886,081 | 12/1989 | Blaul | 134/200 |
| 4,901,743 | 2/1990 | Hittler | 134/200 |
| 4,920,768 | 5/1990 | Cares et al. | 312/1 |

FOREIGN PATENT DOCUMENTS

| | | | |
|---|---|---|---|
| 2112505 | 10/1971 | Fed. Rep. of Germany | 312/1 |
| 0009786 | 3/1985 | Japan | 99/534 |

*Primary Examiner*—Timothy F. Simone
*Attorney, Agent, or Firm*—Donald W. Hanson

[57] ABSTRACT

An installation for processing foods such as fresh fruits and sea foods in a sterilized condition for subsequent freezing and storage operation is disclosed.

The present invention is characterized by that said installation comprises a tunnel shaped sterilized chamber, a number of glove pairs provided on so many openings on the both lateral sides of the sterilized chamber, a partition wall formed at the inlet of sterilized chamber and a solution circulator channel for circulation of washing and sterilizing solution which conveys fresh foods such as fruits and sea foods from outside into the sterilized chamber while washing and sterilizing them.

4 Claims, 3 Drawing Sheets

INSTALLATION FOR PROCESSING FOODS IN A STERILIZED CONDITION

BACKGROUND OF THE INVENTION

This application is a continuation-in-part application of Ser. No. 215,492, filed Jul. 6, 1988, abandoned.

This invention relates to an installation for processing foods such as fresh fruits and sea foods in a sterilized condition for subsequent freezing and storage operations.

Fruits such as bananas, mangoes and papayas produced in Philippines and other countries in tropical areas are generally cropped while they are not fully ripened and then subjected to a supplementary ripening treatment in importer countries prior to being offered to consumers because fully ripened and therefore tasty fruits can be severely damaged during transportation over a long distance.

Obviously, fruits that are cropped while they are not fully ripened are less tasty and flavored than fully ripened fruits, although such operations for unripened fruits as described above are inevitably required to avoid problems of putrefaction that can occur during transportation and/or before quarantine.

The inventor of the present invention has succeeded in developing a freeze-and-store process for fresh fruits in which cropped fruits are immersed in mixed juice of specific fruits and then subjected to a quick freezing operation for storage, a process which is now being applied for patent in Japan. Fruits that have been frozen and stored with this process have to be served without washing because washing such fruits can heavily deteriorate their taste. This can give rise to hygienic problems that may be particularly serious in developing countries because microorganisms can easily rest on the surface of the processed fruits that have not been sterilized.

Apart from fruits, while lobsters and other sea foods are available at a very low cost in Southeast Asia, a large portion of imported sea foods will have to be discarded during quarantine because of insufficient sterilization and presence of microorganisms that have been introduced during on-site freezing operations.

BRIEF SUMMARY OF THE INVENTION

It is therefore an object of the present invention to provide an installation for processing foods such as fresh fruits and sea foods in a sterilized condition for subsequent freezing and storage operations in order to solve the above problems.

It is another object of the present invention to provide an installation for processing foods such as fresh fruits which are available at low cost in Southeast Asia in a sterilized condition in order that the treated foods can be imported and served for use in a frozen but fresh state without giving rise to quarantine problems.

Other objects and advantages of the present invention will become apparent in the course of the following detailed description which is accomplished by referring to the accompanying drawings.

DETAILED DESCRIPTION OF THE INVENTION

Figure 1:
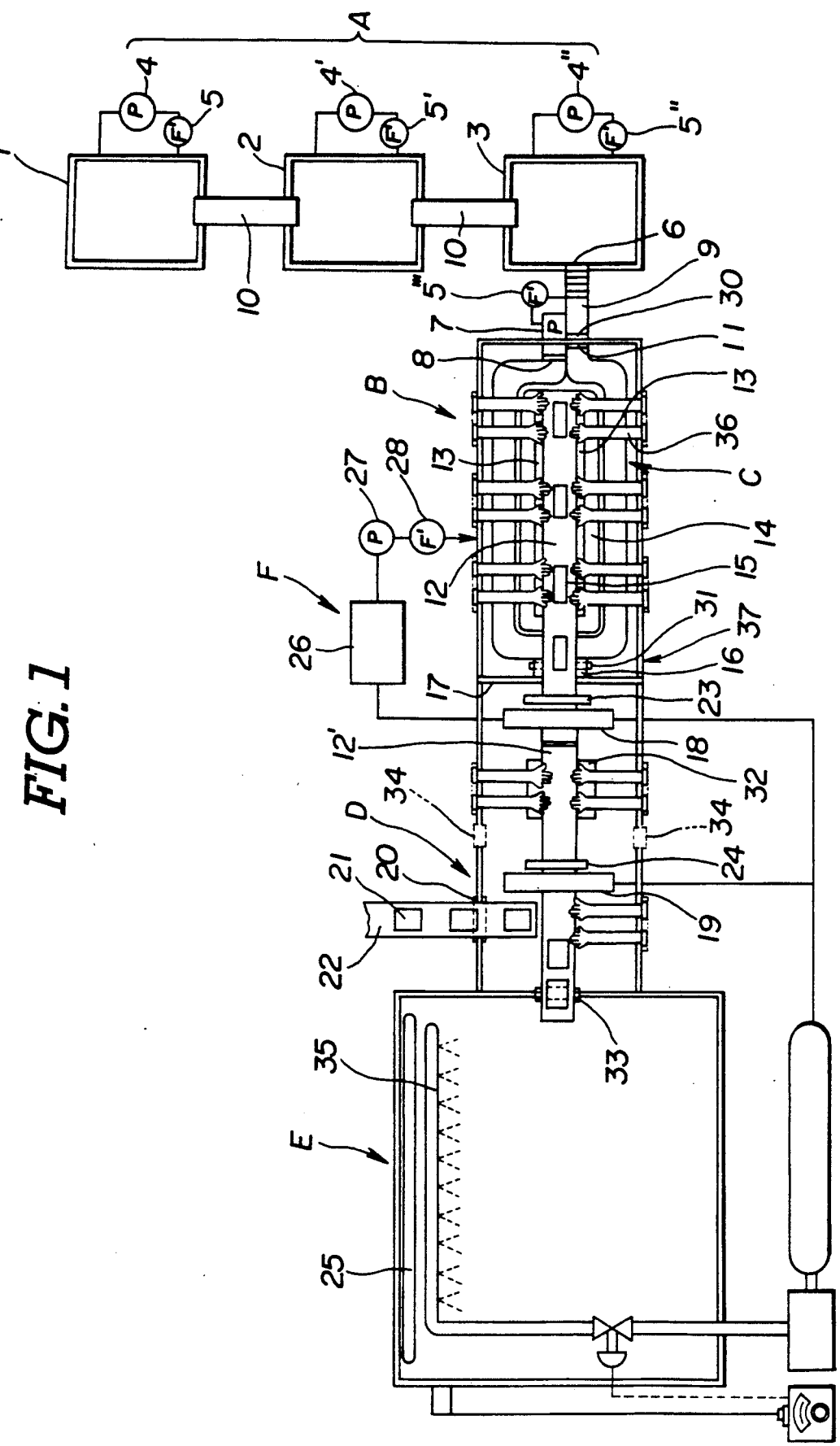
FIG. 1 is a schematic illustration showing the flow of the operations to be carried out in the installation according to the present invention.
Figure 2:
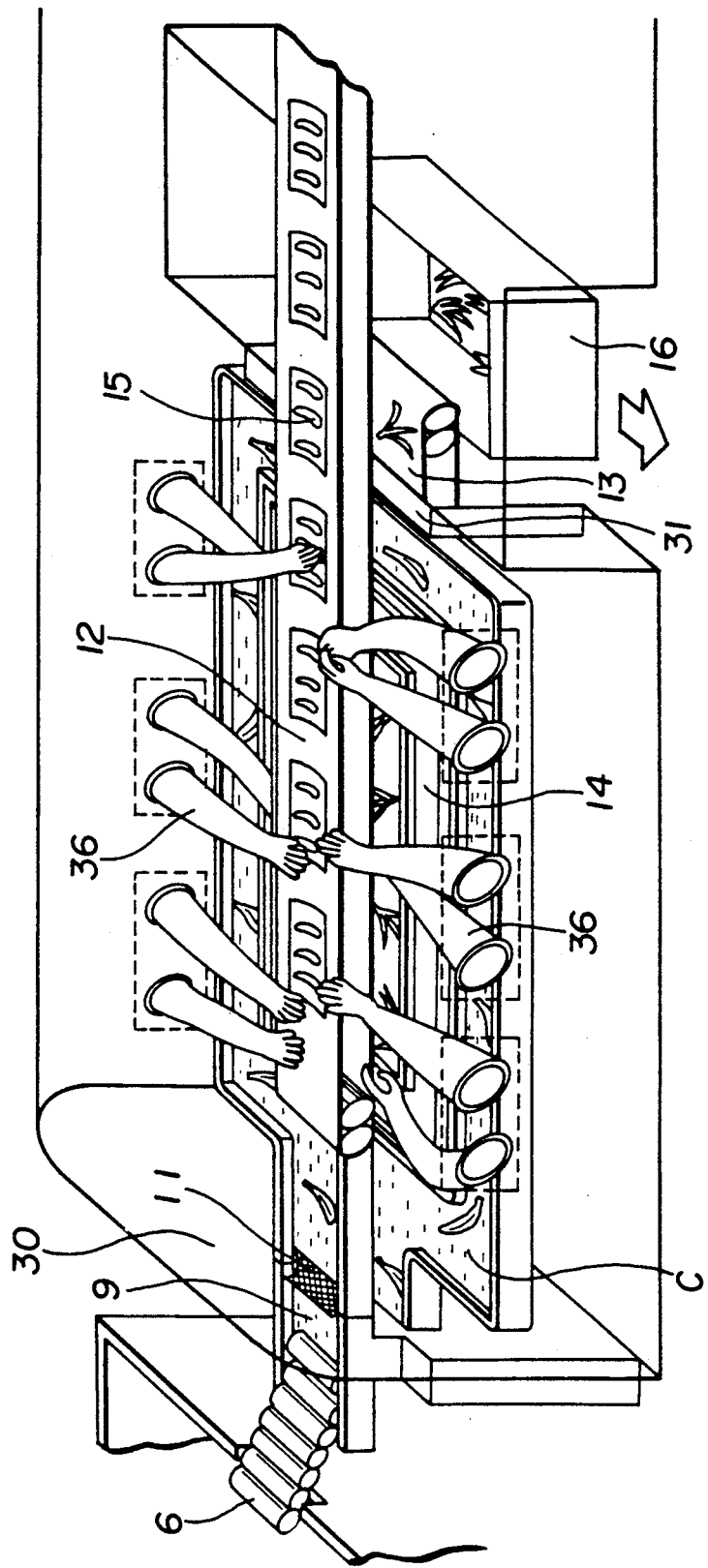
FIG. 2 is a perspective view of the sterilized processing chamber in the installation according to the present invention.

An installation according to the present invention comprises a tunnel shaped sterilized chamber, a number of glove pairs provided on so many openings on the both lateral sides of the sterilized chamber, a partition wall formed at the inlet of the sterilized chamber and a solution circulator channel for circulation of washing and sterilizing solution which conveys fresh foods such fruits and sea foods from outside into the sterilized chamber while washing and sterilizing them. In order to effectively utilize an installation according to the present invention, a freezing chamber using liquid nitrogen can be connected with the outlet of the sterilized chamber, whose inside can be maintained at a pressure higher than the atmospheric pressure by introducing filtered and sterilized gas that contains mixture of nitrogen gas from the freezing chamber and pressurized air from an air compressor. Fruits and other fresh foods that are processed and packaged in the freezing chamber will be maintained in a sterilized condition at an enhanced level because nitrogen gas is automatically sealed in every package of processed foods.

Now an embodiment of the installation according to the present invention will be described by referring to the accompanying drawings.

An installation for processing foods in a sterilized condition according to the present invention essentially comprises a plurality of washing and sterilizing tanks A for fruits and other foods, sterilized processing chamber B, solution circulator channel C for circulating washing and sterilizing solution which convey washed and sterilized fruits and other foods into said sterilized processing chamber, freezing chamber D for quickly freezing and packaging sterilized and processed fruits and other foods using liquidized nitrogen, cold storage chamber E for storing forzen fruits and other foods and means F for mixing nitrogen gas from tank 26 for temporarily storing nitrogen gas after being used for freezing and compressed air from air compressor 27 and for feeding said mixed gas into sterilized processing chamber B.

Washing and sterilizing tanks A for fruits and other food in the above embodiment comprises first tank 1, second tank 2 and third tank 3. Fruits and other foods are typically washed with brush in first tank 1, moved to second tank 2 on endless conveyor belt 10, washed with cloth in second tank 2, moved further to third tank 3 on an endless conveyor belt and washed for finishing in tank 3. Sterilizing agents that can be used in washing and sterilizing tanks A preferably include those which are normally used for sterilization of foods and not very toxic to human bodies such as acid additive agents that contain as principal components a variety of metal salts and non-metal salts obtained through reaction of vermiculite, a weathered product of mica minerals (preferably black mica), and inorganic acid (such as sulfuric acid or hydrochloric acid) solution. Tanks 1 to 3 are circularly connected, through which water is circulated by means of pumps 4, 4' and 4", insoluble impurities contained in the water being removed by filters 5, 5' and 5". Use of acid additive agents as described above can cause organic compounds dissolved in water to deposit and agglomerate for ease of removal.

Above said third tank is provided with roller conveyor 6 for tranferring washed and sterilized fruits and other foods from third tank 3 into solution circulator channel C by way of inlet port 9 of sterilized processing chamber B.

Washing and sterilizing solution runs from the starting point through graded solution circulator channel C and then back to its starting point by way of pump 7, where insoluble impurities are removed by means of filters 5, 5' and 5".

Figure 3:
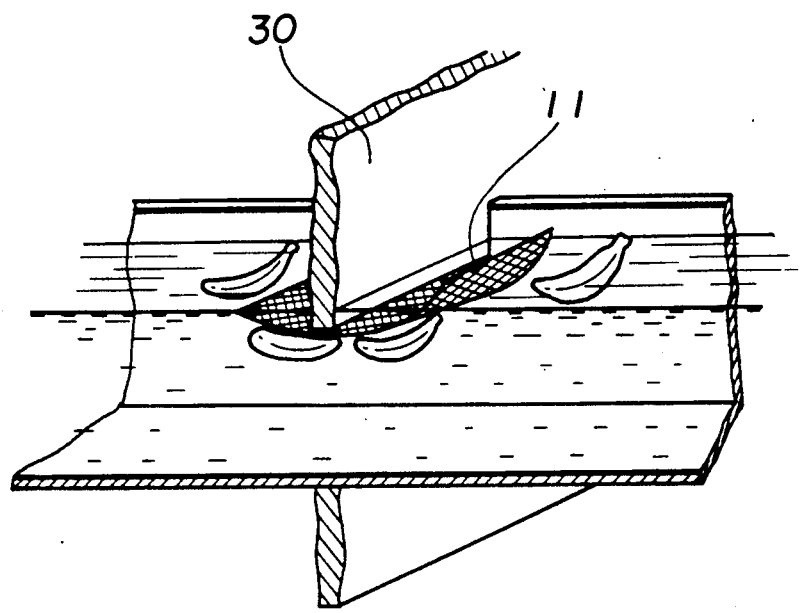
FIG. 3 is a perspective view of the guide plate in the installation according to the present invention.

The bottom section of partition wall 30 provided at the inlet of the sterilized processing chamber is dipped in water. Guide plate 11 which is slightly bulged toward outside is formed at the bottom of said partition wall 30 in such a manner that it extends upwardly and outwardly on both sides of said wall like a pair of wings as shown in FIG. 3. Guide plate 11 is made of very tightly woven mesh of fine stainless steel wires so that foams that can be generated during transfer of bananas and other foods and carrying microorganisms therewith up to the sterilized processing chamber are expelled upward through the mesh.

Reference numeral 8 in FIG. 1 denotes a net set up in the course of the solution circulator channel which is designed to catch fruits and other foods running down along the channel without being caught by any of the pairs of gloves in the processing chamber.

The solution in solution circulator channel C contains sterilizing agent as described earlier like the solution in tanks 1 to 3, their concentrations being so arranged that tanks 1 to 3 and solution circulator channel have solutions with concentrations that decrease in descending order.

Sterilized processing chamber B comprises tunnel shaped sterilized chamber main body 37 provided with a number of pairs of gloves 36 for operators standing outside, upper conveyor 12 for transferring fruits and other foods coming down along solution circulator channel C with or without processing, lower conveyor 13 for transferring peels of fruits and other by-products of processing and channel of mixed fruit juice 14 or immersion of fruits and other foods.

The sterilized chamber main body in the above embodiment is made of acrylic resin. While a sterilized chamber main body made of any transparent material may be acceptable, organic glass such as acrylic resin is advantageous over inorganic glass because the former is less likely to form dew drops and become cloudy than the latter.

Conveyor 12 carries dishes 15 made of finely woven mesh and operates pick up fruits and other foods running down along solution circulator channel C and put them on dishes 15 after or without processing. In a recommended processing that can be conducted in this sterilized chamber, fruits are peeled and, after being cut into pieces having a size and shape most appropriate for serving if desired, immersed in mixed fruit juice that consists of a vitamin C containing natural juice and a sweetened juice for boosting flavor of the processed fruit. An example of such mixed juice may be made of lemon juice and pineapple juice. Channel of mixed fruit juice is filled with such mixed juice.

Both upper conveyor 12 and lower conveyor 12 are endless belt conveyors, where the belts are made of metal mesh so that they do not interfere with the performance of the air curtains to eliminate contamination.

Lower conveyor 13 extends through air curtain 31 to outside so that fruit peels and other by-products can be dumped into outside box 16.

Freezing chamber D is connected with the sterilized processing chamber via partition wall 17 on one hand and with cold storage chamber D by way of air curtain 33 on the other. Freezing chamber D comprises liquid nitrogen jet nozzle (first nozzle) of 18 for preliminarily freezing fruits and other foods on belt conveyors 12, 12', heat sealing machine 32 for heat sealing fruit containing bags having a reduced inside pressure, liquid nitrogen jet nozzle (second nozzle) 19 for fully freezing fruits in bags after heat sealing and endless belt conveyor 22 for introducing cardboard boxes 21 from outside through air curtain 20. Reference numeral 34 in FIG. 1 denotes an air curtain and boxes may be also moved into the processing chamber through this curtain if required.

Temperature of the inside of cold storage chamber E and freezing chamber D is automatically controlled through automatic adjustment of the amount of injected liquidized nitrogen per minute by opening and closing the control valve in accordance with pressure signals generated in a temperature controller device from temperature sensed by temperature sensing terminal 23, 24 and 25.

Means F for introducing nitrogen gas used for freezing operation into the sterilized processing chamber comprises tank 26 for storing nitrogen gas coming from the nitrogen gas outlet, air pump 27 for adding pressurized air to the nitrogen gas in tank 26 and introducing the mixed gas into sterilized processing chamber B and filter 28 for screening and sterilizing nitrogen gas coming from the air pump.

Now the function of the embodiment comprising the above components will be described for processing bananas.

Sterilizing solution obtained from the reaction product of vermiculite and hydrochloric acid are dissolived in the water in tanks 1 to 3 and the solution circulator channel in advance so that their concentrations decrease in descending order. Bananas are washed in tank 1 for cleaning the surfaces, separated into individual pieces and washed with cloth in tank 2 and washed for finishing in tank 3.

Then the bananas are moved to inlet port 9 by means of conveyor 6, where they are introduced into solution circulator channel C.

The introduced bananas flow along the channel and then are guided into sterilized processing chamber B by guide plate 11.

Operators standing along the both lateral sides of the sterilized chamber main body takes up the bananas one by one and peel them with hands wearing so many gloves provided at the openings on the sides walls of the main body. The peeled bananas are immersed in mixed juice in channel 14 and then placed on dishes 15 on upper conveyor 12, while peels are put on lower conveyor 13.

The bananas on upper conveyor 12 are moved under first jet nozzle 18 of liquid nitrogen for freezing the surface and then packed in bags by operators, which are heat sealed by heat sealing machine 32 and moved further to pass under second jet nozzle 19 of liquid nitrogen for full freezing. The bags of frozen bananas are packed in cardboard boxes 21 coming from outside on belt conveyor 22 through air curtain 20 and then sent into cold storage chamber E through air curtain 33 for storage.

It would be obvious that an installation according to the present invention has applications for fruits of other types as well as lobsters and other sea foods.

As described above, an installation according to the present invention having a relatively simple configuration can be used for processing and freezing fruits and sea foods in a sterlized condition and hence fruits and other foods produced and available at a relatively low cost in south east Asia can be frozen in a fresh condition on site and then imported without quarantine problems in importer countries, where they are thawed and served without causing any hygienic hazards.

What is claimed is:

1. Installation for processing foods in a sterilized condition, wherein said installation comprises a tunnel shaped sterilized chamber made of transparent material and having an inlet and a plurality of openings on lateral sides of the sterilized chamber, each of said openings having a glove pair provided therein, a partition wall formed at the inlet of the sterilized chamber and a solution circulator channel for circulation of washing and sterilizing solution which conveys fresh foods such as fruits and sea foods into the sterilized chamber while washing and sterilizing them.

2. Installation for processing foods in a sterilized condition according to claim 1, wherein said sterilized processing chamber is provided with a channel of mixed fruit juice for immersion of fruits and other foods, a conveyor for transferring fruits and other foods and a conveyor for transferring peels of fruits and other by-products of processing.

3. Installation for processing foods in a sterilized condition according to claim 1, said solution circulator channel for circulating washing and sterilizing solution carries solution containing acid additive agents that contain as principal components a variety of metal salts and non-metal salts obtained through reaction of vermiculite, a weathered product of mica minerals, and inorganic acid solution.

4. Installation for processing foods in a sterilized condition according to claim 1, a freezing chamber using liquid nitrogen is connected with the sterilized chamber, whose inside can be maintained at a pressure higher than the atmospheric pressure by introducing filtered and sterilized gas that contains mixture of nitrogen gas from the freezing chamber and pressurized air from an air compressor.

* * * * *